United States Patent [19]

Müller et al.

[11] 4,281,518
[45] Aug. 4, 1981

[54] METHOD AND APPARATUS FOR SEPARATING PARTICULAR COMPONENTS OF A GAS MIXTURE

[75] Inventors: Martin Müller; Albert Seidel, both of Siegertsbrunn; Gunther Schmidt, Taufkirchen; Holm Schubert-Klempnauer, Kolbermoor; Werner Malburg, Neubiberg; Rolf A. Brand, Ottobrunn, all of Fed. Rep. of Germany

[73] Assignee: Messerschmitt-Bölkow-Blohm GmbH, Fed. Rep. of Germany

[21] Appl. No.: 113,743

[22] Filed: Jan. 21, 1980

[30] Foreign Application Priority Data

Jan. 23, 1979 [DE] Fed. Rep. of Germany ....... 2902391
Apr. 20, 1979 [DE] Fed. Rep. of Germany ....... 2915953

[51] Int. Cl.³ .............................................. F25J 1/02
[52] U.S. Cl. ........................................ 62/12; 62/66; 62/306; 62/40
[58] Field of Search ................. 62/10, 12, 18, 66, 306, 62/40

[56] References Cited

U.S. PATENT DOCUMENTS 1,057,052  3/1913  Guye ........................................ 62/12
3,179,662  4/1965  Zinsstag et al. ........................ 62/10
3,798,918  3/1974  Maher et al. ............................ 62/12

Primary Examiner—Norman Yudkoff
Attorney, Agent, or Firm—McGlew and Tuttle

[57] ABSTRACT

A method of separating certain components of a gas mixture in which the gas mixture is cooled and certain components are separated in a liquid or solid state characterized by introducing the gas mixture into a separator tank, adding a cooling agent such as a liquid or cold inert gas so as to cool the gas mixture and separating component in a solid state and subsequently fusing the separated solid into a liquid in a collecting tank. The concentrated gas mixture to be separated is directly removed from its place of use and directly supplied to the separator tank without allowing any further admixture of secondary air. The device for carrying out the method comprises an insulated tank to which air having entrained sulfer dioxide is introduced. The air flow is controlled so that it is oriented in a particular direction and it is passed beyond nozzles for injecting an inert gas such as liquid nitrogen into the interior of the insulated tank. This causes the component to form a solid substance in the form of a snow which is subsequently recovered at the lower end of the tank in an insulated collecting tank portion which advantageously includes means to heat the substance to form it into a liquid.

11 Claims, 4 Drawing Figures

METHOD AND APPARATUS FOR SEPARATING PARTICULAR COMPONENTS OF A GAS MIXTURE

FIELD AND BACKGROUND OF THE INVENTION

This invention relates in general to a method and apparatus for treating gas and in particular to a method of separating components from a gas mixture in which the gas mixture is cooled and the components are separated in a liquid or solid state.

Up to the present time, in general, certain undesirable components of gas mixtures have been separated in wet chemical process, i.e. by a chemical reaction in a liquid state. It is also known to cool the components to be separated on cooled surfaces, such as surfaces of heat exchangers, whereby they are separated in liquid or solid state. In processes of this kind it is necessary to continuously remove the separated deposit from the cool surfaces by scraping or melting. The disadvantage thereof is particularly that the efficiency of separating decreases with the increasing thickness of the deposit and that the operation must be interrupted to remove the separated component, which also entails losses in cold energy. In addition, prior art methods require fairly expensive equipment.

The present invention is an improvement over the prior art particularly in respect to the fact that a concentrated gas mixture to be separated is directly removed from its place of use and directly supplied to a separator tank without allowing any further admixture of secondary air. In addition, the invention provides an improved apparatus for carrying out the method in which a sterilizer is employed in which a concentrated gas mixture for sterilizing equipment is received which is directly connected into the separator tank for separating the components.

SUMMARY OF THE INVENTION

The present invention is directed to a separation method and device which avoids the use of expensive equipment, especially heat exchangers, and provides a direct precipitation, in a solid state, of the component to be separated.

In accordance with the invention certain components of a gas mixture are separated therefrom by cooling the gas mixture so as to cause these components to go into a liquid or solid state. The separated components are then heated so that they may be collected in a liquid form. The gas mixture of which the components are to be separated is introduced into a separator tank and a cooling agent such as liquid or cold inert gas is added into the tank, preferably in the form of a spray to cause the components to separate from the gas mixture in a solid state and then to become fused into a liquid state in a collecting tank. With the present invention, the concentrated gas mixture to be separated is directly removed from its place of use and directly supplied to the separator tank without allowing any further admixture of secondary air. In addition, the sterilizer in which the concentrated gas mixture for sterilizing equipment is received is directly connected to the separator tank.

In the prior art methods of recovering gases from gas mixtures, particularly those employed for sterilizing bottles or medical equipment, the gas mixtures, for example from sterilizers, are directed to a waste gas chimney so that ambient air has access and can further rarify the gas mixture. Considerable equipment is then needed to scrub out the sterilization gas from this mixture and high costs are incurred.

Experience has shown that this disadvantage can be eliminated by supplying the gas mixture directly from the place of use through a closed line to the separator. This makes the separation in the separator far less expensive as compared with the separation of a rarified gas mixture.

The inventive method and device can particularly well adapt to the separation of $SO_2$ from $SO_2$-air mixtures which are obtained in the beverage industry during sterilization of bottles, or of ethylene oxide-air mixtures such as employed for sterilizing medical equipment made of plastics.

In the inventive process, the component to be separated freezes at a high temperature, flocculates and is expensive separated from the gas mixture in a centrifugal field. A fine separation is obtained by means of a rotating exhaust outlet. The separated flake snow drops to the bottom of the separator tank, is melted by metered heat supply, and may then be recycled to the process where it is properly employed.

More particularly, the method serves to separate components from a gas mixture where a component is present in a higher concentration. A specific example of application is the separation of sulfur dioxide from a sulfur dioxide-air mixture used in the beverage industry for sterilzing (sulfurizing) bottles (wine or beer). Another example of advantages of the application is the separation of ethylene oxide from an ethylene oxide-air mixture in instances where the ethylene oxide is used for sterilizing medical equipment made of plastics. It is to be noted that sulfur dioxide, and particularly ethylene oxide, are highly poisonous substances which must therefore, be removed from the mixtures with a high degree of efficiency. The same applies to carbon monoxide which can be separated with the inventive method from carbon monoxide-air mixtures.

The inventive method may further be employed for separating organic gases from air mixtures, for example hydrocarbons from waste gases in paint-spraying, chemical cleaning, and other chemical process where solvents become free.

The employed coolant is preferably liquid nitrogen which is obtained as a byproduct in sufficient amounts during the separation of air. It should be noted that by liquid inert gas, liquefied inert gas is to be understood which is gaseous under normal conditions.

To increase the efficiency of the method, or of the device, the gas mixture wherefrom a certain component is to be separated may be introduced along the inside of the outer wall of the separator tank, whereby the costs of tank insulation are reduced and the introduced gas mixture is cooled in advance.

It is further possible to introduce an adsorptive agent into the interior of the separator tank, which substantially reduces the needed amount of liquid inert gas. Suitable adsorption agents are, particularly, activated carbon, graphite, silicates such as bentonite or montmorillonite, ion exchangers, etc.

The inside of the outer wall of the separator tank may be provided with an additional inner shield, to reduce losses of cold through the tank wall. This also prevents snow deposits caused by superficially melted flakes.

In general, the component to be separated should be present in the processed gas mixture in a higher concentration, preferably of about 1%.

To separate $SO_2$ it is usually necessary to cool the gas mixture down to a temperature of at least $-75°$ C. by introducing the coolant, in particular liquid nitrogen, if no cooled adsorption agent is introduced into the separator tank. In normal processes, thus without introducing adsorption agents and without a heat exchanger, the introduced air mixture is cooled to a temperature of $-110°$ C. to $-120°$ C.

As already mentioned, the method as a whole is substantially more effective and less expensive in equipment than the prior art methods. It was customary in the prior art to separate undesirable gases, such as $SO_2$ from air, by directing them through a scrubber and oxidizing them substantially with ozone. With the inventive method, 95% of the component to be separated can be removed from a gas mixture and thus recovered.

Accordingly, it is an object of the invention to provide an improved method of separating certain components from a gas mixture in which the gas mixture is cooled and certain components are separated in a liquid or solid state and characterized in that the gas mixture is introduced into the separator tank and a cooling agent such as a liquid or cold inert gas is injected into the tank and a component is separated in solid state and then fused into a liquid state in a collecting tank connected to the bottom of the separator tank and further characterized by the fact that the concentrated gas mixture to be separated is directly removed from its place of use and directly supplied to the separator tank without allowing any further admixture of secondary air.

A further object of the invention is to provide a device for treating the gas in order to remove a component therefrom which comprises an insulated separator tank having means for directing air with the component therein into the tank and orienting the flow thereof, means for adding a inert gas to cool the gas mixture so as to separate a component therefrom in a solid form, and second means downstream of said means for heating the component which has been separated to form it into a liquid.

A further object of the invention is to provide a device for treating a gas to remove a component therefrom which is simple is design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
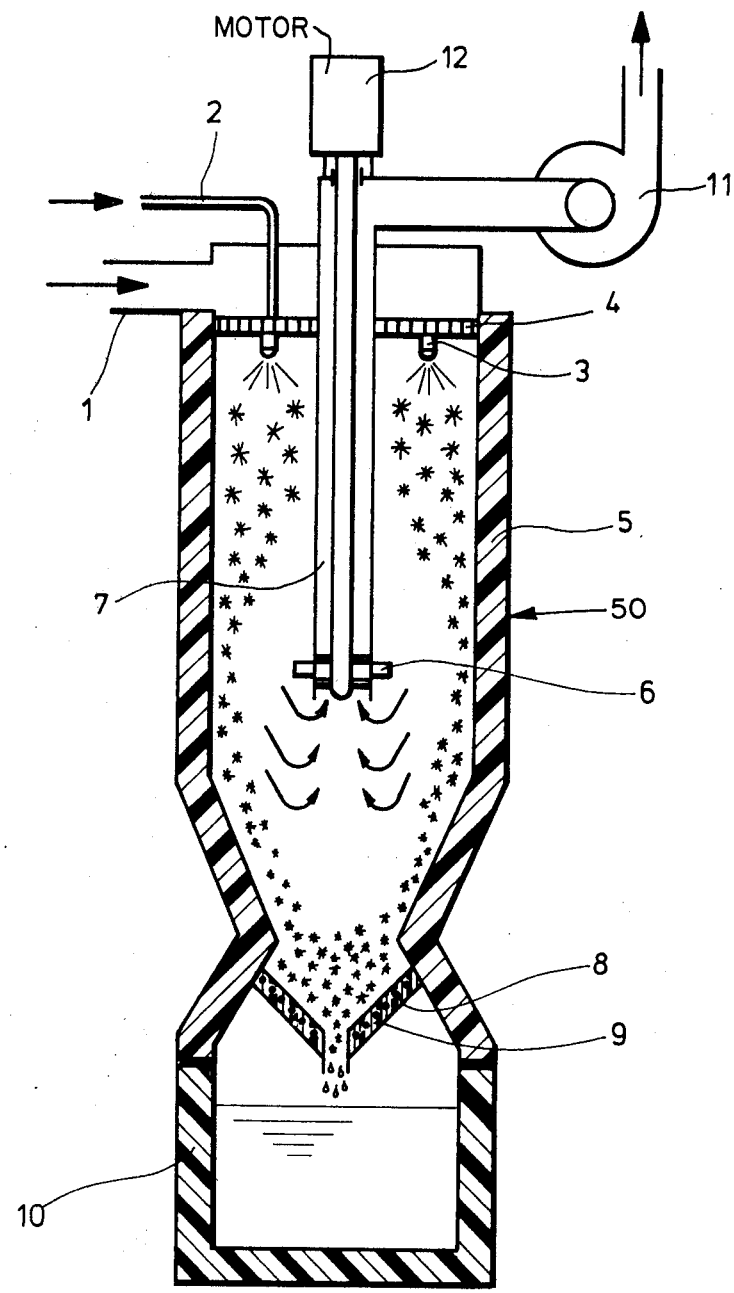
FIG. 1 is a schematic sectional view of a device for separating particular components of a gas mixture in accordance with the invention.

In the following, the invention is explained in more detail while referring to the drawings. The separation of $SO_2$ from an $SO_2$-air mixture by means of liquid nitrogen is taken as example.

Before treating the example in detail, the invention, in its method, is summarized as a method of separating a component chosen from the group consisting of sulfur dioxide, ethylene oxide and hydrocarbons which are gaseous or liquid at normal temperatures, from a component plus air mixture. Normal temperatures are defined as room temperature and temperatures above and below room temperatures which is prevalent in the natural environment.

FIG. 1 is a diagrammatical, general showing of the separating device. The air mixed with $SO_2$ enters a device generally designated 50 at inlet 1, passes through a flow straightener 4 to obtain a uniformly descending air stream, and is then mixed with finely atomized liquid nitrogen which is introduced into the tank through nozzles 3. The strong temperature drop causes a formation of $SO_2$ snow flakes which descend along with the air stream. The air stream is put in rotary motion by a rotor 6, which is driven by an electric motor 12, so that the heavier $SO_2$ snow flakes are thrown by the centrifugal force to the insulated tank wall 5, along which they pass as a rotating cylindrical stream into an insulated collecting tank 10. In the shown embodiment, the $SO_2$ snow is accumulated in a funnel having walls heated electrically by a coil 8 embedded in insulation of the wall 9, to liquefy the snow. Collecting tank 10 may be exchanged for an empty one, upon temporarily switching off the funnel heating, or the liquid may be drained by means of a pump (not shown).

The rotating air in the separator tank flows to an exhaust tube 7 surrounding a rotor shaft, and is further accelerated in its rotary motion by rotor 6 and then discharged through exhaust tube 7 by an exhauster 11. A further fine separation of the $SO_2$ snow is thereby obtained.

Figure 2:
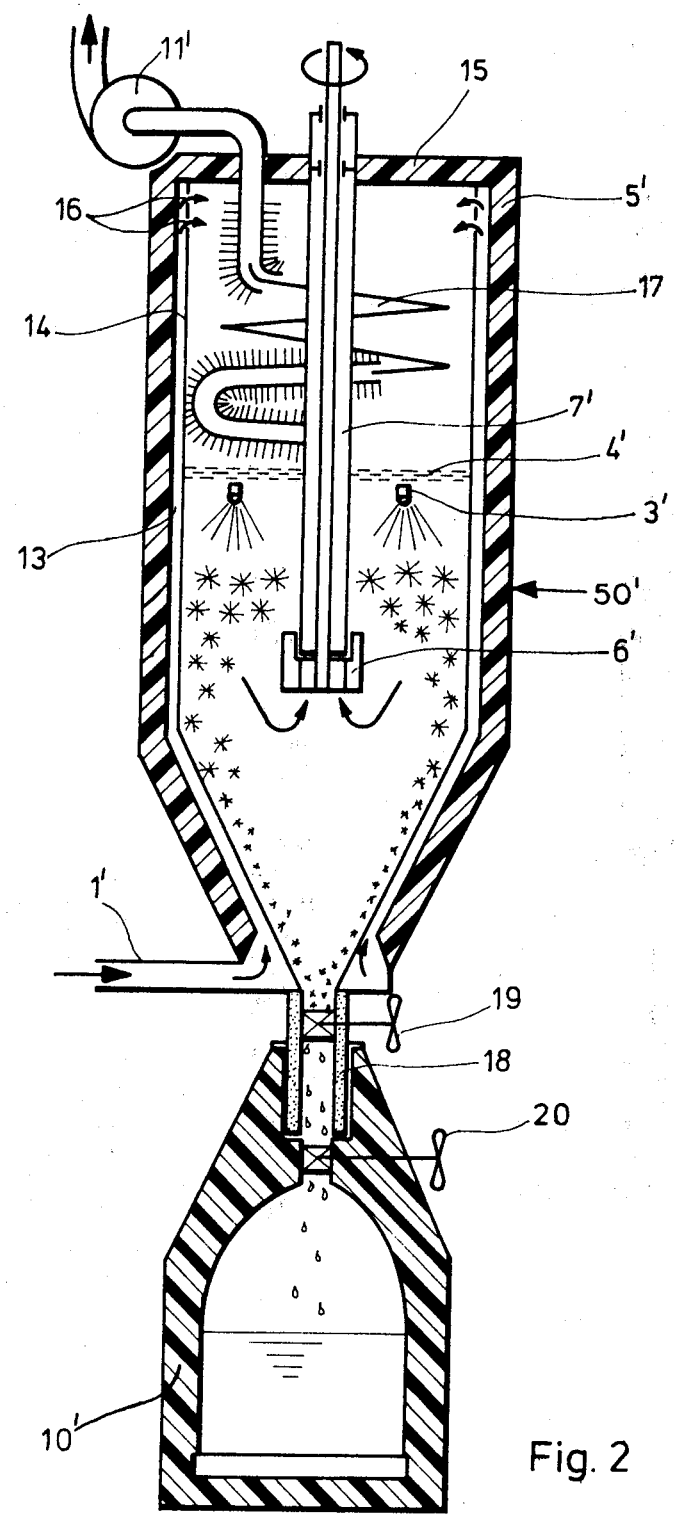
FIGS. 2 and 3 are views similar to FIG. 1 of other embodiments of the device.

FIG. 2 shows an improved embodiment of a device generally designated 50' with an increased effectiveness of the "nitrogen cold".

The supplied $SO_2$-laden air is conducted from an inlet 1' along the insulated outer wall 5' of the tank through conduction space 13 defined between the outer wall 5' and an inner wall 14 whereby it is only slightly cooled. This substantially reduces the heat incidence through the tank insulation, or a less expensive insulation may be used.

This air conduction causes the $SO_2$ snow which is formed to melt at the inner wall 14 of the tank, and this "cold" is transferred to the supplied air.

The supplied air entering the tank below a cover 15 through radial ports 16 is further cooled by a heat exchanger coil 17 (through which cold exhaust air is directed), and flows through an air flow orienter or straightener 4' and is sprayed with liquid nitrogen. The amount of required liquid nitrogen when is sprayed through nozzles 3' is thus reduced.

$SO_2$ snow forms and is thrown against the inner wall 14 of the tank, as mentioned above. There the snow melts and slides as "snow slush" along the warmer wall 14 down into collecting tank 10. This "slush process" may be controlled by the air velocity and direction in conduction space 13.

A collecting tank 10' is connected to the separator tank portion 52 thereabove, for example, through a Johnson-coupling 18 permitting an exchange, with the passage to the collecting tank being closed or opened by means of hand-operated valves 19 and 20.

The cold SO₂ liquid may then be removed by exchanging the tank, or through a bottom pump, and recycled to the plant where the SO₂ is needed, for example, for sterilization during bottle cleaning.

The exhaust air, as already mentioned is accelerated in rotation by rotor 6' and taken off through a central exhaust tube 7' by means of exhauster 11'. In this embodiment, the air has transferred its "cold" to the supplied air and leaves the device with an only small "loss of cold".

Figure 3:
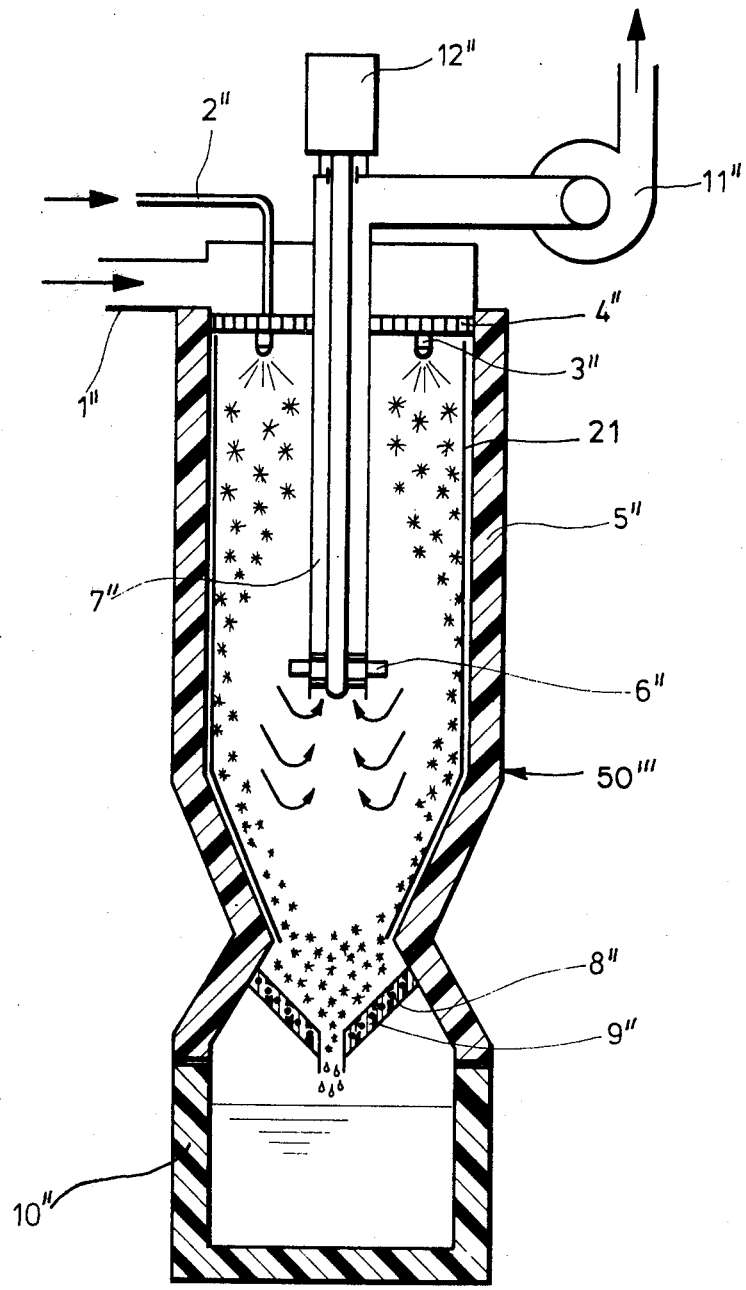
Figure 4:
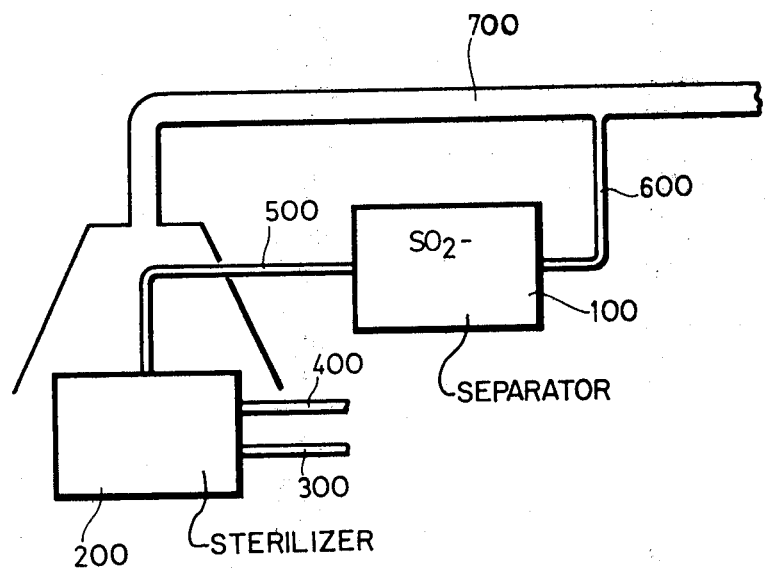
FIG. 4 is a schematic diagram of a device for carrying out the improved aspects of the inventive device.

FIG. 3 shows a separator tank device generally designated 50" equipped with an additional inner shield 21. The shield 21 reduces the "losses of cold" through a tank wall 5" since no turbulence occurs in the gap. On the other hand, inner shield 21 is kept at a relatively low temperature so that snow deposits are prevented which would be caused by slightly melted flakes.

The obtained liquid SO₂ may be removed from a collecting tank 10" by means of a pump and directed to the desired process or into a storage tank. A rotor 6" in the separator tank may be of various designs and it may be mounted in overhung position on the end of a long shaft and comprise radial blades ("twirling stick"). The rotor 6" also may have blades which are extended upwardly to prevent air from being sucked through the gap. In addition, to such extended blades, the rotor body may be of conical shape. This is to permit an outflow of solid particles which would be separated within the cone. Aside from the "twirl blades", the rotor 6" may be equipped with a distinct pump blading. Such pumping take off the peripheral flow and effects an intense subsequent separation from the air entering the orifice of a central exhaust tube 7".

The following is a specific example of separation illustrating the efficiency of the inventive method:

| Amount of crude gas (SO₂ + air): | 50 m³ |
| therefrom SO₂: | 1.8 m³ |
| supplied amount of nitrogen (LN₂): | ca 30 kg |
| recovered amount of SO₂: | ca 95% |
| temperature in the separator: | 165 K. (−108° C.) |

If necessary, several inventive separators may be connected in series.

In accordance with an improved version of the invention sterile air is introduced through a line 400 and SO₂ gas is introduced through a line 300 into a sterilizer 2 for cleaning bottles. From this sterilizer 2 the used gas mixture of sterile air and SO₂ is directed through a line 5 into an SO₂ separator generally designated 100 which is of a type shown in FIGS. 1-3. From the sterilizer 200 used gas mixture of sterile air and SO₂ is directed through a line 5 into the SO₂ separator 100. From the separator 100 the exhaust air which is substantially free of SO₂ is discharged through a line 600 into a waste gas chimney 700. In the prior art sterilizers the used gas is exhausted directly into the waste gas chimney 700 and the gas mixture thus discharged and containing a large amount of secondary air is then to be treated to remove the SO₂, for example, by scrubbing. This, of course, required ample equipment for treating large gas volumes.

While specific embodiments of the invention have been shown and described in detail to illustrate the application of the principles of the invention, it will be understood that the invention may be embodied otherwise without departing from such principles.

What is claimed is:

1. A method of separating a component chosen from the group consisting of sulfur dioxide, ethylene oxide and hydrocarbons which are gaseous or liquid at normal temperature, from a gas mixture of the component plus air comprising:

directing the gas mixture at such normal temperatures downwardly into a separator tank;

supplying finely atomized liquid nitrogen into the tank to mix with the gas mixture and form flakes of the component due to a sudden drop in temperature of the gas mixture, to form a stream in the separator tank;

rotating the stream to accelerate the flakes outwardly toward walls of the separator tank and separate the flakes from the air in the tank;

removing the air from the tank;

melting the flakes after they are separated from the air to form liquid component; and removing the liquid component from the separator tank.

2. A method according to claim 1, wherein the gas mixture is first conducted along the wall of the tank so that its temperature is reduced and then it is directed downwardly in a uniform stream within the tank and wherein the tank is provided with insulation on the exterior of the wall over which the gas mixture is directed, further including directing a portion of the air which is removed through a cooling coil in the separator tank and directing air which has separated from its component in heat exchange relationship with the incoming gas mixture.

3. A method according to claim 1 wherein the separator tank is provided with an inner shield of insulation so as to reduce the losses of cold through said separator tank wall preventing the flakes from depositing thereon.

4. A method according to claim 1 wherein a small portion of the separated component is recycled in its liquid state and injected into the separator tank to accelerate the formation of solid flakes.

5. A method according to claim 1, including introducing adsorption agents into the separator tank in order to reduce the quantity of liquid nitrogen which is necessary.

6. A method according to claim 5, wherein activated carbon, graphite, molecular sieves, bentonite, montmorillonite or ion exchangers are used as adsorptive agents.

7. A method according to claim 1, wherein the gas mixture comprises the highly concentrated gas to be separated which is directly removed from its place of use and directly supplied to said separator tank without allowing any further admixture of secondary air.

8. A method according to claim 7, wherein a concentrated sulfur dioxide air waste gas comprises the gas mixture which is supplied from a bottle sterilizer is directly removed from the sterilizing process and supplied to the separator tank.

9. A device for separating a component chosen from the group consisting of sulfur dioxide, ethylene oxide and hydrocarbons which are gaseous or liquid at normal temperatures, from a gas mixture of the component plus air, comprising:

a housing having an insulated outer wall and an inlet for receiving the gas mixture;

flow straightening means in said housing for straightening a flow of gas mixture in said housing into a stream;

a nozzle for injecting liquid nitrogen into said stream in said housing for mixing liquid nitrogen with said stream to suddenly reduce the temperature of said gas mixture and form solid flakes of the component;

a rotor rotatably mounted in said housing for rotating the stream to accelerate the solid flakes outwardly toward the housing outer wall, said rotor centrally positioned in said housing and having a conduit defined therein for receiving air from the gas mixture after it has been separated from the solid flakes;

heating means in said housing below said rotor for receiving the solid flakes of component and melting the solid flakes into liquid component; and a collecting tank below said heating means for receiving liquid component.

10. A device according to claim 9, including an inner wall in said housing spaced inwardly of said outer wall and defining a gas mixture space therewith; said inlet communicating with said space at a lower end of said housing whereby the gas mixture is first directed upwardly through said space and pre-cooled by the contents of said housing and thereafter directed downwardly into said housing, and a heat exchanger coil connected to said conduit defined in said rotor for receiving at least some of the air removed from said housing whereby the air in said heat exchanger coil cools gas mixture passing said heat exchanger coil in said housing.

11. A device according to claim 9, including a shield spaced inwardly of said outer wall of said housing for maintaining a cool condition in said housing whereby flakes moving against said shield do not melt before they reach said heating means.

* * * * *